United States Patent [19]
Gross et al.

[11] 4,107,673
[45] Aug. 15, 1978

[54] RADAR SYSTEM WITH IMPROVED BRIGHTNESS AND RESOLUTION

[75] Inventors: Fritz A. Gross; William M. Pease, both of Weston; John E. Meade, Lexington; Harry Vickers, Oakham, all of Mass.

[73] Assignee: Raytheon Company, Lexington, Mass.

[21] Appl. No.: 755,320

[22] Filed: Dec. 29, 1976

Related U.S. Application Data

[63] Continuation of Ser. No. 612,882, Sep. 12, 1975, abandoned, which is a continuation of Ser. No. 413,130, Nov. 5, 1973, abandoned.

[51] Int. Cl.² .............................................. G01S 7/06
[52] U.S. Cl. ............................. 343/5 DP; 343/5 SC
[58] Field of Search ......................... 343/5 DP, 5 SC

[56] References Cited

U.S. PATENT DOCUMENTS

| | | | |
|---|---|---|---|
| 3,412,398 | 11/1968 | Schrader | 343/5 SC |
| 3,569,966 | 3/1971 | Dunn et al. | 343/5 DP X |
| 3,571,479 | 3/1971 | Horattas et al. | 343/5 DP X |
| 3,683,373 | 8/1972 | Barnes et al. | 343/5 DP |
| 3,810,174 | 5/1974 | Heard et al. | 343/5 DP |
| 3,827,027 | 7/1974 | Towson et al. | 343/5 SC X |

*Primary Examiner*—Malcolm F. Hubler
*Attorney, Agent, or Firm*—J. D. Pannone; M. D. Bartlett; H. W. Arnold

[57] ABSTRACT

A radar system with improved display brightness in high ambient lighting conditions and with simplified deflection and video amplifiers. The incoming radar return signals are digitized and stored in shift registers with the timing to write the data into the shift registers dependent upon the radar range setting. After the digitized radar return signals have been read into the shift registers, they are read out to the display in a constant time period independent of the range setting. The radar system may be used at closer ranges than was previously possible.

25 Claims, 12 Drawing Figures

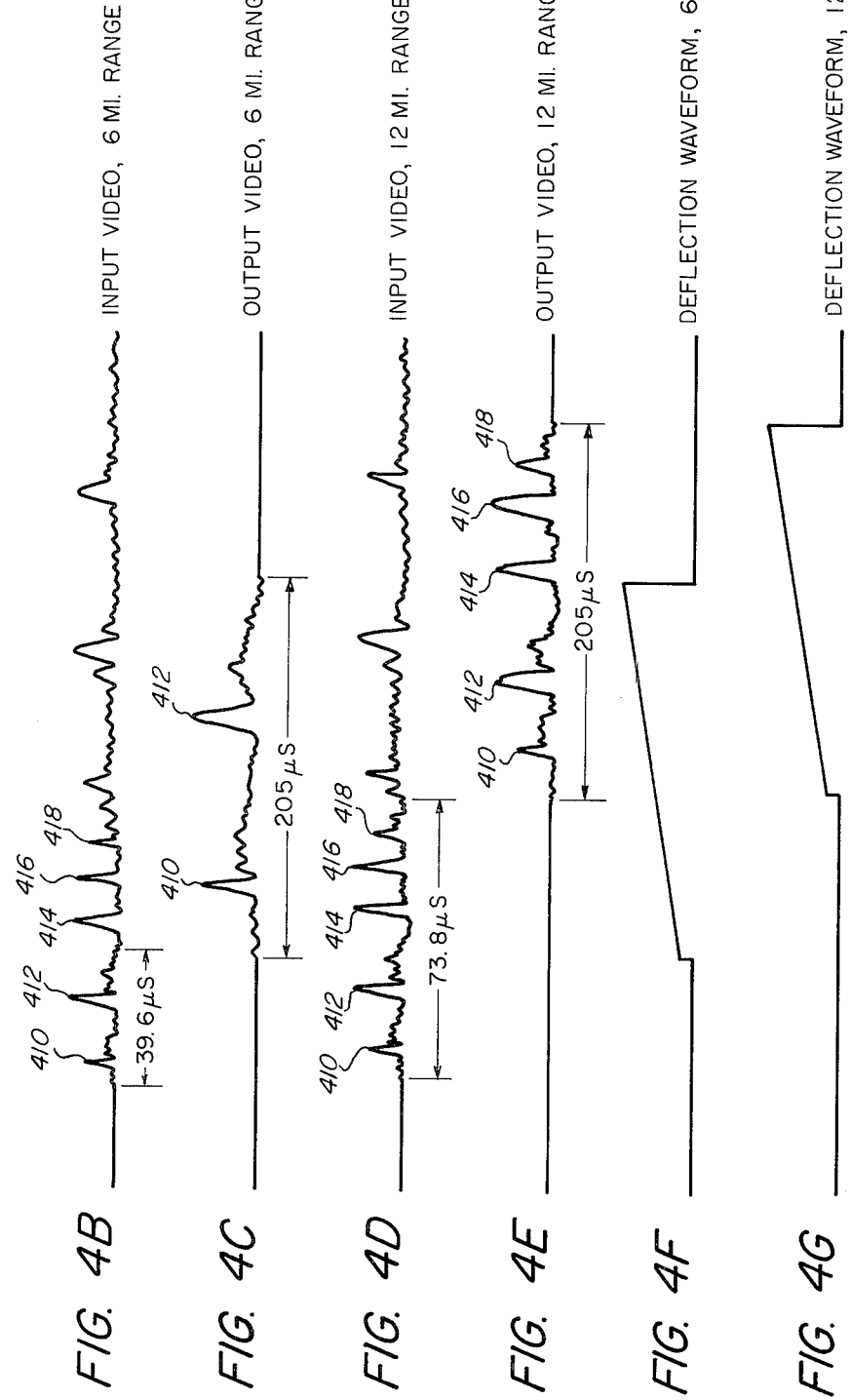

RADAR SYSTEM WITH IMPROVED BRIGHTNESS AND RESOLUTION

CROSS REFERENCE TO RELATED APPLICATIONS

This is a continuation of application Ser. No. 612,882 filed Sept. 12, 1975, now abandoned, which is a continuation of application Ser. No. 413,130 filed Nov. 5, 1973 (now abandoned).

BACKGROUND OF THE INVENTION

In previous radar systems for small ships, radar data has been displayed in real-time. A problem arose since when radar return signals are processed on a real-time basis, the writing rate of the display cathode-ray tube beam is inversely proportional to the radar range setting and, hence, the display brightness varies with range setting. For the shorter radar range settings, the writing rate upon the display screen became so great that the phosphor on the screen did not receive sufficient electron beam energy during the sweep of the beam to produce sufficient light output to overcome the background ambient light. The lighting problem frequently made these radars difficult to use on boat and airborne radars, both applications which typically are subject to high ambient lighting.

Attempts to solve these problems include those in which the data to be displayed was written first in real-time upon a storage tube and then read out and displayed upon a cathode-ray tube. The reading out from the storage tube took place at a slower rate than the rate at which the pattern was written into the storage tube. These systems suffer from a number of inherent problems. Such systems are costly in that two separate deflection and cathode-ray tube systems must be provided in each radar display. Secondly, performance was degraded below that which could be obtained with only a single tube in that additional noise and loss was introduced with the second tube system.

Another major difficulty with previous systems was that when the range setting was changed, the deflection waveforms also had to be changed to accommodate the sweep time required for the particular range setting chosen. At short ranges, the sweep waveforms into the deflection coils of the cathode-ray tube display were quite short. Consequently, in order to move the beam from the center of the screen to the edge of the screen in the required time took high values of the rate of change of the current in the deflection coils. This, in turn, induced high voltages into the deflection circuitry and made the deflection circuitry difficult and expensive to construct. Also, the fact that the beam deflection time changed for each range setting made it necessary to construct deflection circuits which had a broad frequency range of operation. Moreover, the bandwidth of the deflection amplifiers had to be greater for the short ranges than for the long ranges.

In a preferred embodiment, digital representations or samples of a radar return signal are written into storing means in a first time period and read out in a second time period, the second time period being greater than the first time period for at least some ranges of a radar range setting. Additionally, the first time period may be proportional to the radar range setting while the second time period remains constant. Clocking means which supplies timing pulses to the storage means may be used for determining the first and second time periods. For generating writing clock pulses, a continuously cycling binary counter is preferably used wherein one of the outputs of the counter is selected by the range switch as the source of writing, timing or clocking pulses.

The present invention may also be practical with the method of transmitting and then receiving radar signals, converting received signals to digital representations thereof storing at least a portion of those representations at a first rate, reading out the representations at a second rate slower than the first rate, and displaying data in response to the read out radar return signals.

SUMMARY OF THE INVENTION

The display brightness is improved by the present invention wherein digitized samples or representations of radar return signals are produced by taking the radar return signals which are written into storage means. The writing takes place at a rate dependent upon the radar range setting. After the digitized radar return signals have been written into storage and, in a preferred embodiment before the start of the next radar transmission, the signals are read out in a predetermined constant time period independent of the radar range setting. The thus obtained improvement in brightness is most evident in short radar range settings since the time period for display of the radar return signals is increased over previously available radar systems. The storage may be either one or more shift registers or a random access memory. In a preferred embodiment, a plurality of shift registers are used with the digitized signals sequentially distributed among them, thus permitting the shift registers to each be operated at a slower rate than would be necessary if a single shift register had been used. The display is preferably a cathode-ray tube display operated in the PPI mode. Either a single revolving deflection coil or two coils and a sweep resolver may be used. A flat panel display such as a plasma panel or an LED panel may also be used with the present invention. Moreover, means may be included to set the brightness level of the display separately for each different digital value to which the radar return signals are digitized.

BRIEF DESCRIPTION OF THE DRAWINGS

FIGS. 4A–4G are a series of waveforms illustrating the processing of radar signals in accordance with the teachings of the present invention.

DESCRIPTION OF THE PREFERRED EMBODIMENT

Figure 1:
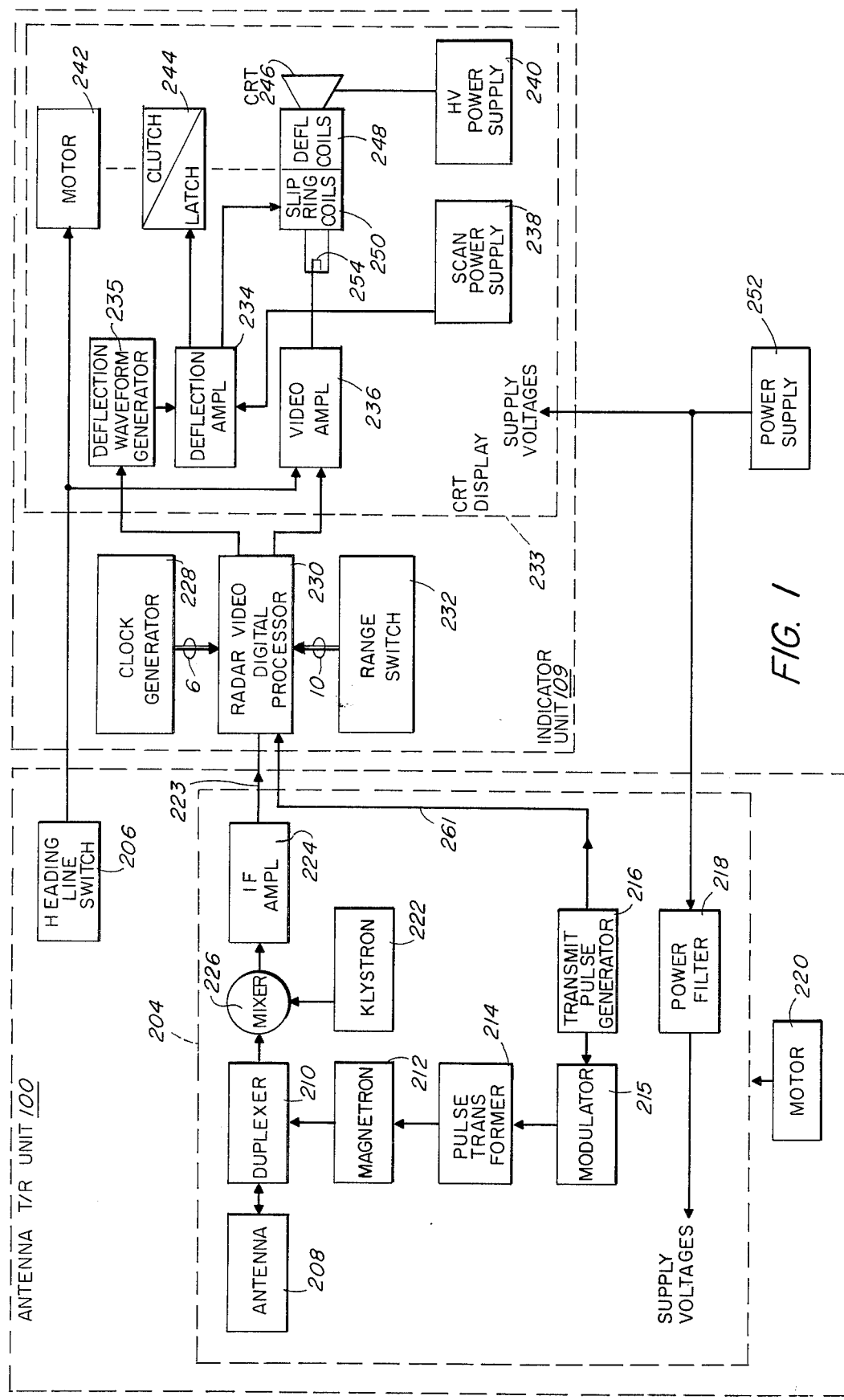
FIG. 1 is a block diagram of a radar system in which the present invention is used to advantage.
Figure 2A:
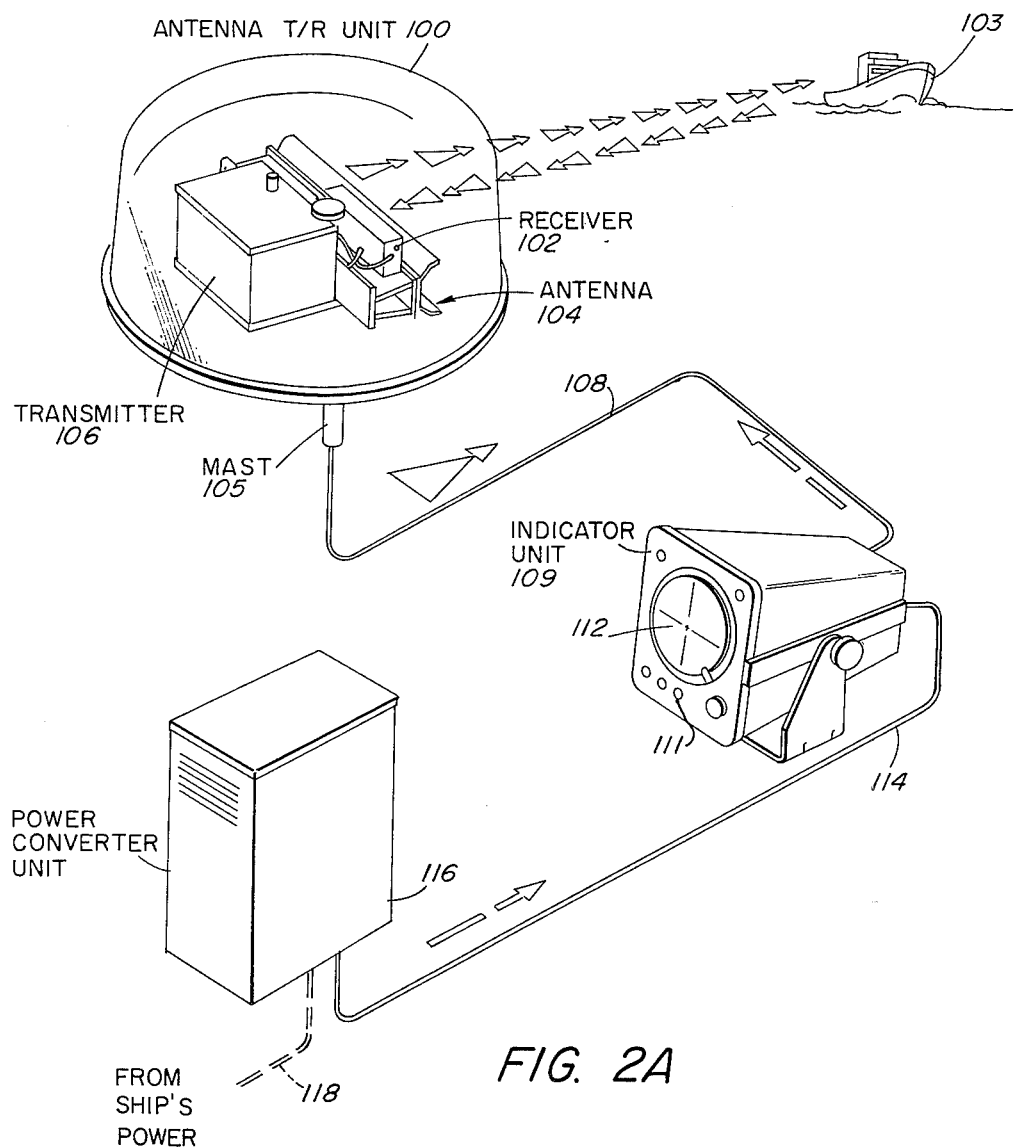
FIG. 2A is a perspective view of the elements of such a radar system.

Referring to FIGS. 1, 2A and B, 3 and 4A–G there is shown a pictorial diagram of a ship's radar system in which the present invention is used to advantage. As shown more in specifically in FIGS. 2A and 2B, antenna transmit/receive unit 100 is mounted on boat 120 with antenna T/R unit 100 clear of any obstructions on boat 120. Transmitter 106, receiver 102 and antenna 104 are mounted atop mast 105 and are rotated by a motor, not shown. Antenna 104 radiates pulses generated by transmitter 106 while the unit is being rotated. The pulses strike targets such as ship 103 and are reflected from the targets back to antenna 104. Receiver 102 then amplifies the returned pulses and converts then to an IF or video signal which is conducted down transmission line 108 to indicator unit 109. Indicator unit 109 displays the radar information in the PPI mode of operation wherein the beam of the cathode-ray tube 112 is swept outward at the same angle relative to the ship's bow as antenna 104 is currently pointing. In this system, there is one sweep of the cathode-ray tube 112 beam for each pulse transmission from transmitter 106 and antenna 104. As the beam is swept outward from the center of cathode-ray tube 112, the current in the beam and consequently the brightness on the screen is modulated in response to the video signal on transmission line 108.

Figure 2B:
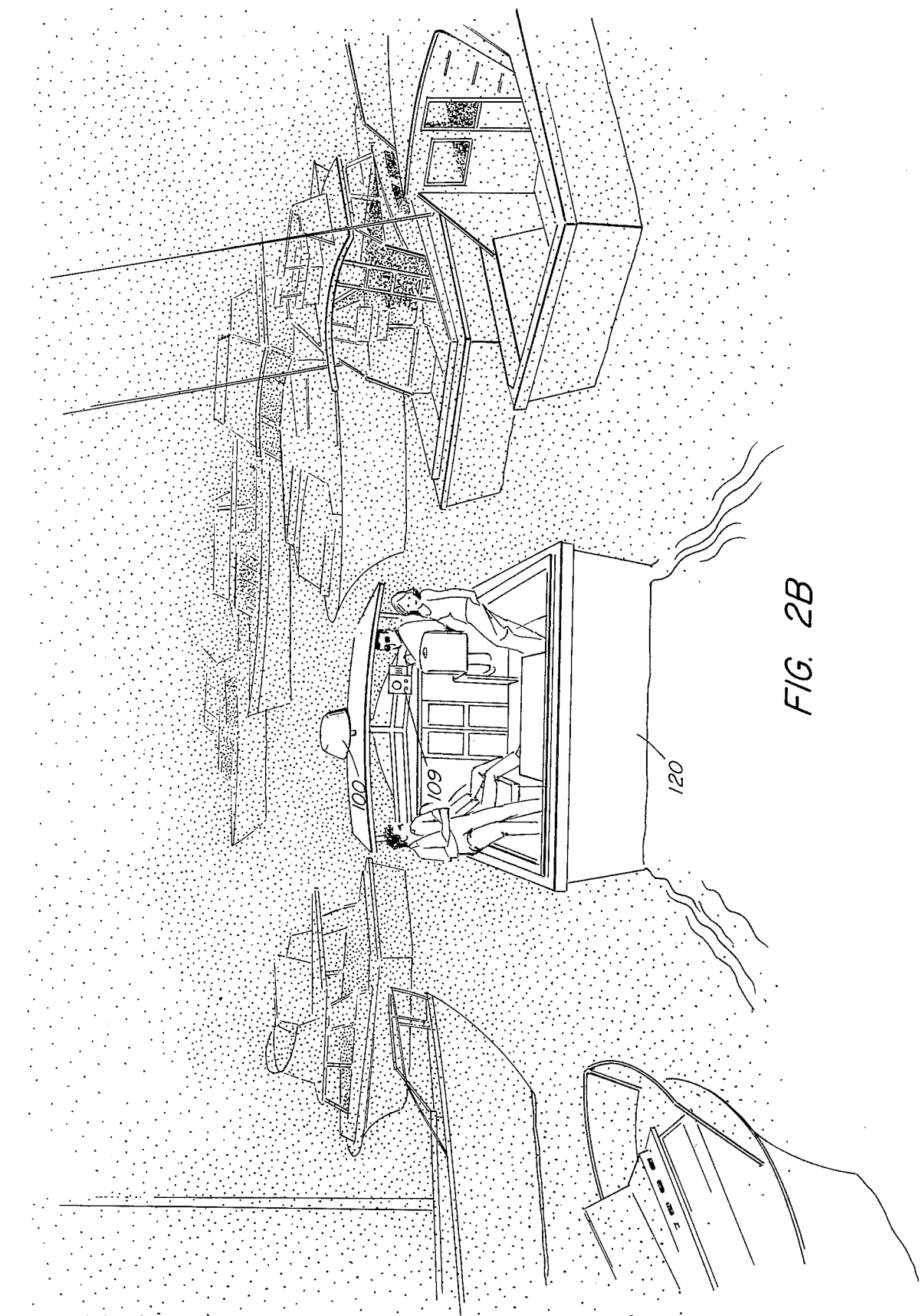
FIG. 2B is a perspective view illustrating an application where the present invention is used to advantage in maneuvering through a harbor.

In ships' radar systems of this type, indicator unit 109 has a range switch 111 which selects the distance in nautical miles along the surface of the sea which is represented by one radius of the cathode-ray tube 112 of indicator unit 110. Different settings or ranges of range switch 111 may represent typically distances of 32 miles to distances below 1 mile. As explained above, in previous such radar systems, the speed of the cathode-ray tube beam as it is swept across the face of cathode-ray tube 112, was in inverse proportion to the setting of range switch 111 since the rate at which the beam sweeps is determined by the return time for radar pulses at the range selected by range switch 111. Hence, because of the high beam velocity at short ranges, previous radar systems suffered the problem of low brightness for shorter ranges. Unfortunately, it was often in these shorter ranges that the greatest accuracy and brightness were required, such as in docking operations and maneuvering through a foggy harbor as shown in FIG. 2B where accuracy and readability of data displayed upon the indicator unit are critical. The problem became acute when the indicator unit was mounted in an area of high ambient lighting as is frequently necessary. In contrast, with the present invention the brightness of indicator unit 109 is maintained even at the short range settings of range switch 111 allowing the radar to be used in situations such as illustrated in FIG. 2B.

In FIG. 1 is shown the block diagram of a radar system in which the present invention is used to advantage. Pulse generator 216 initiates radar transmission by producing a radar triggering pulse and coupling the pulse to modulator 215 where the waveform of the radar pulse to be transmitted is generated. That pulse waveform is then coupled from modulator 215 through pulse transformer 214 to magnetron 212 where it is amplified to a sufficient level of power. The pulse waveform is next coupled through duplexer 210 to antenna 208. Duplexer 210 operates to allow transmitted radar pulses to be coupled through in one direction while allowing received pulses to be coupled back from antenna 208 to mixer 226 in the other direction. Antenna 208 functions for both transmitting and receiving modes. The received radar return signals are beat against a reference frequency signal from klystron oscillator 222 in mixer 226. The output of mixer 226 becomes the unamplified IF or video signal which is then amplified by IF amplifier 224 to a level sufficient for analog-to-digital conversion in radar video digital processor 230. Pulse generator 216 also produces a second pulse coincident with the first pulse which is coupled to radar video digital processor 230 as a signal that the radar transmission has begun.

Power filter 218 smooths the incoming DC power and distributes it to each of the units within dotted lines 204. Motor 220 rotates the packaged assembly of antenna transmit/receive unit 100. Additionally, located near antenna transmit/receive unit 100 is heading line switch 206. Heading line switch 206 produces a pulse output each time the antenna direction in which the antenna is pointed is in parallel with the longitudinal axis of the ship. This pulse provides a marker so that the operator has an indication as to which direction the radar is pointing at any one instant of time.

From IF amplifier 224 the radar return signals, each of which comprises the echoes from a single radar pulse transmission, are conveyed along transmission line 223 to radar video digital processor 230 within indicator unit 109. Radar video digital processor 230 converts the incoming radar return signals to digital form, stores them as they are received from IF amplifier 224, and, after the radar reception has been completed for one radar return time, reads them back out to CRT display 233. The rate at which radar return signals are read into radar video digital processor 230 is determined by the setting of range switch 232. The read-out time, for at least some ranges, is independent of the rate or time period in which the radar return signals were written into the radar video digital processor 230 and can be made greater than the write-in period so that the displayed data has much greater brightness than it would otherwise have. Clock generator 228 furnishes timing and clock pulses necessary for the operation and control of data within the radar video digital processor 230.

After being read out of storage within radar video digital processor 230, the radar return signals are reconverted to analog form and coupled for final amplification to video amplifier 236. The beam of cathode-ray tube 246 is deflected by deflection coils 248 which are in turn driven by deflection amplifier 234. The deflection coils 248 are rotated around the neck of cathode-ray tube 246 by motor 242 coupled through clutch and latch 244. The amplified deflection waveforms are coupled from deflection amplifier 234 through the slip ring assembly 250 to deflection coils 248. This is termed a rotating coil type PPI display although a resolved sweep type of PPI display can be used as well with the present invention and yet retain its advantages. The pulse from heading line switch 206 within antenna transmit/receive unit 202 is used to synchronize motor 242 and deflection waveform generator 235 with the direction in which the antenna 208 is headed.

The design of deflection amplifier 234 is considerably simplified with radar systems constructed in accordance with the teachings of the present invention. With the present invention, the deflection amplifier does not have to respond to the short duration but full deflection waveforms that were previously used for short ranges. In the present invention, deflection amplifier 234 need be designed only to accommodate the slower deflection waveforms used when the data is read out and displayed at the lower rate. Since a major portion of the cost of prior deflection amplifiers went into high frequency components to accommodate the high frequencies resulting from the short duration waveforms, deflection amplifiers used with the present invention are correspondingly made less expensive since these high frequencies are no longer present to a great extent.

High voltage power supply 240 supplies the accelerating potential to the final anode of cathode-ray tube 246 while scan power supply 238 supplies operating power for deflection amplifier 234. The design of scan power supply 238 is also simplified when the present invention is used since scan power supply 238 can now supply power to the deflection amplifier 234 during beam deflection at a slower rate than was previously required for the short duration deflection waveforms used in previous systems.

Figure 3A:
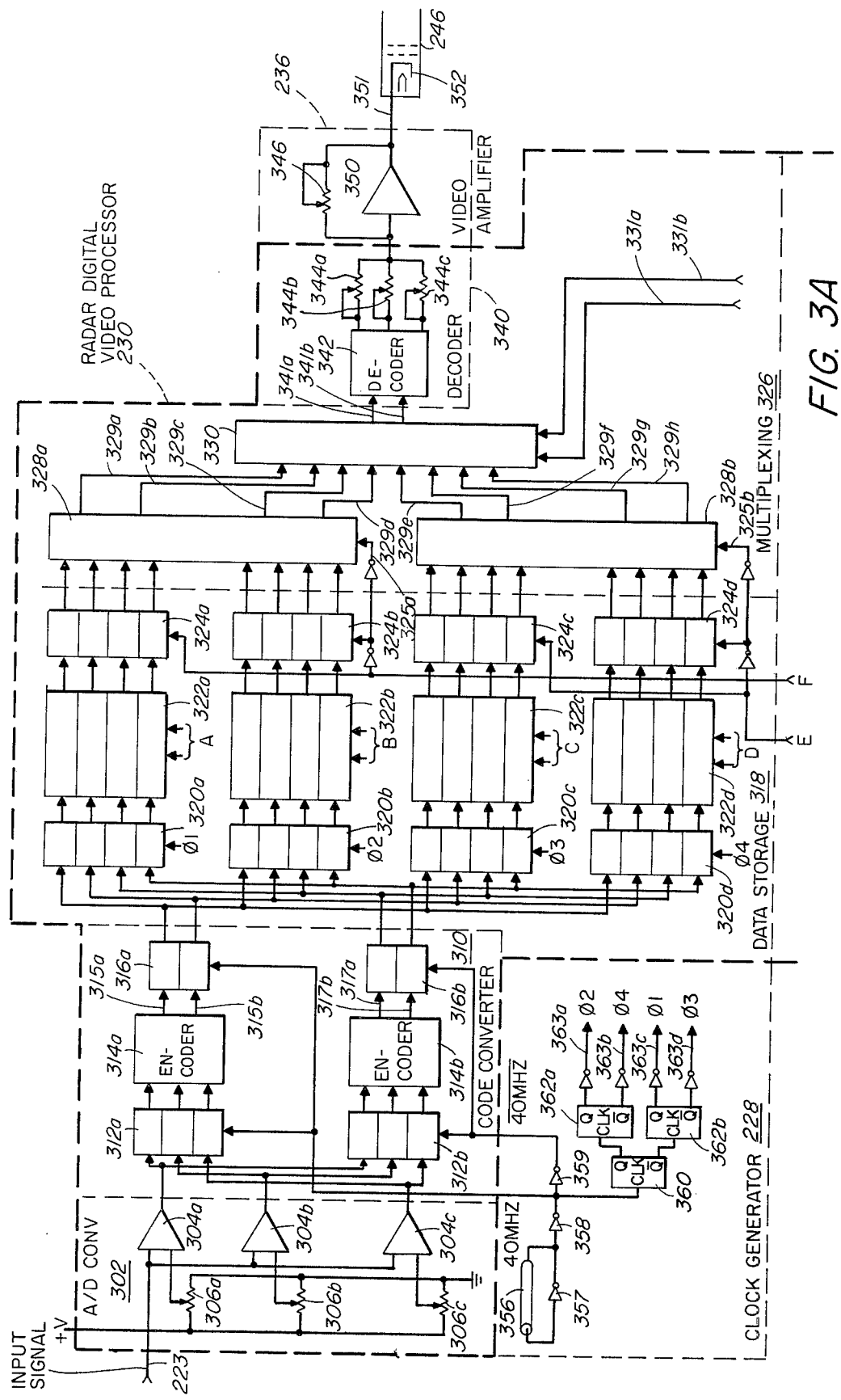
FIGS. 3A and 3B are schematic diagrams of the digital processing portion of a radar system using the present invention.
Figure 3B:
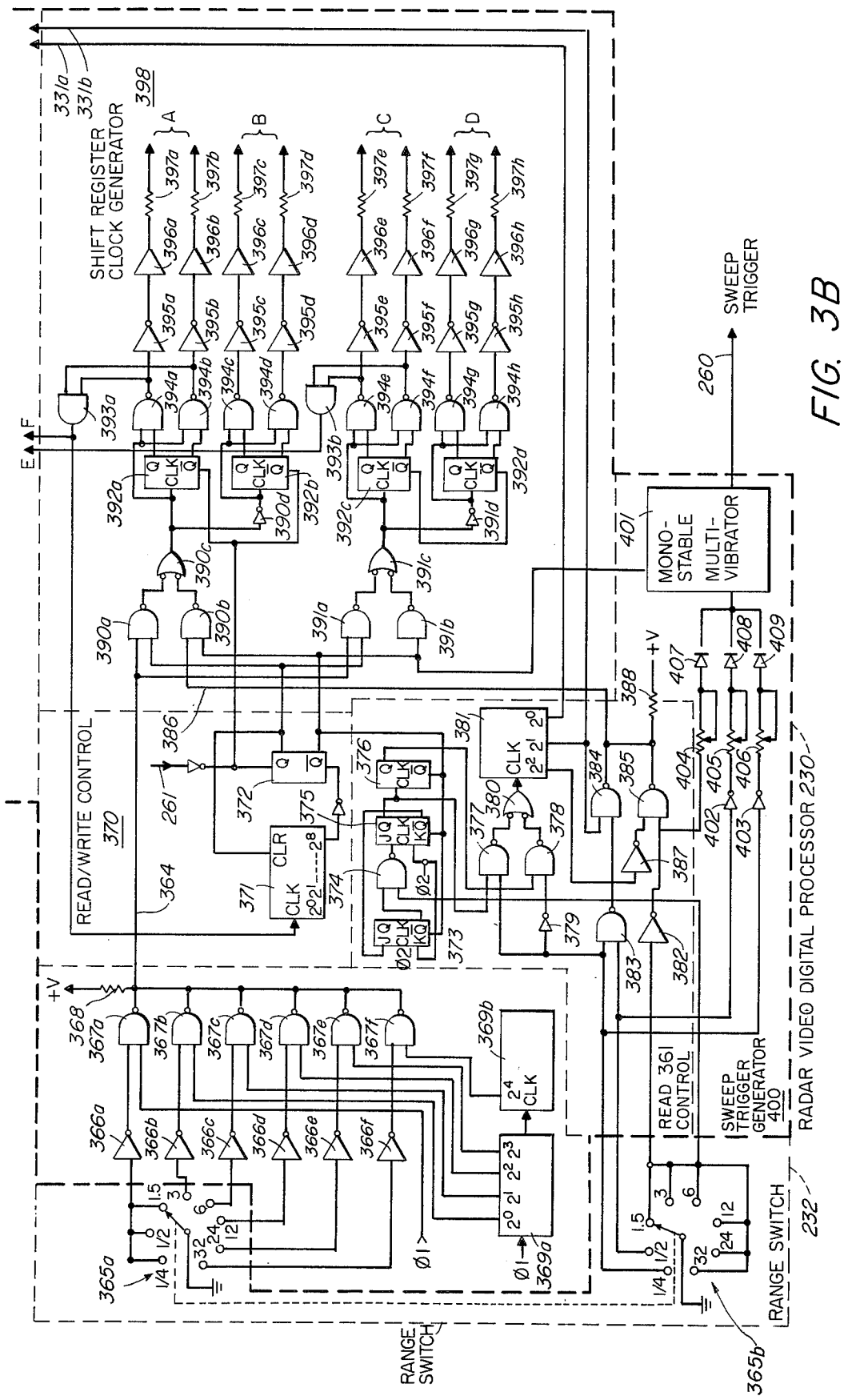

In FIGS. 3A and 3B is shown a schematic diagram of the digital processing portions of a radar system constructed in accordance with the teachings of the present invention. The incoming radar return signals in analog form are brought into the digital processing circuitry on line 223 and are coupled to one input of each of voltage comparators 304a–c. Voltage comparators 304a–c operate to produce a first output voltage representing a logical 0 when the first input is below the voltage level of the second input and produce a second output voltage level representing a logical 1 when the first input is above the voltage level of the second input. The second inputs of each of voltage comparators 304a–c are coupled to the center terminal of adjustable resistors 306a–c. One outer terminal of each of adjustable resistors 306a–c is connected to a voltage source +V which is always greater than the peak possible value of signals on line 223 while the other outer terminals of adjustable resistors 306a–c are connected to ground. With this arrangement, the input voltage to the second input of each of the voltage comparators 304a–c is separately adjustable between 0 and +V volts so that each of comparators 304a–c changes from its first to second output logical states at a different value of incoming signal level. In the preferred embodiment, when the signal on line 223 is below a predetermined minimum level, the output voltage from each of voltage comparators 304a–c will be in the 0 state as represented by a low voltage level. When the signal on line 223 exceeds this minimum voltage level as set by adjustable resistor 306a but is below a first intermediate level as set by adjustable resistor 306b, the output from comparator 304a will be in the 1 state as represented by a relatively high voltage level while the outputs from voltage comparators 304b and c will remain in the 0 state. When the input signal on line 223 exceeds the first intermediate value but is below a second intermediate level as set by adjustable resistor 306c, the outputs from comparators 304a and b will be in the 1 state while the output from voltage comparator 304c remains in the 0 state. Finally, when the voltage level of the signal on line 223 exceeds the second intermediate level, the outputs from all three comparators 304a–c will be in the 1 state.

These outputs from voltage comparators 304a–d are coupled from A/D converter section 302 to code converter section 310. The three output lines from converters 304a–c become inputs to two sets of registers 312a and b, both of which are clocked by 40 MHz clock with the clock signal to one 180° out of phase with the other. Hence, samples of the radar return signal are loaded into one then the other of registers 316a and b at a total effective rate of twice the clock rate to one register or 80 MHz. The registered signal is next coupled to encoders 314a and b which convert the signal as it is presented on the three incoming lines to a two-bit binary code. If all of the three incoming lines are in the 0 state, lines 315a and b, or lines 317a and b for encoder 314b, are both in the 0 state. If the first of the three incoming signals is in the 1 state and the others are in the 0 state, lines 315a or 317a will be in the 0 state while lines 315b or 317b will be in the 1 state. If two of the incoming lines are in the 1 state and one is in the 0 state, lines 315a or 317a will be in the 1 state and lines 315b or 317b will be in the 0 state. Finally, if all three of the incoming lines are in the 1 state, both of lines 315a and 315b or 317a and 317b will be in the 1 state. The thereby encoded radar return signal samples or representations are now stored in converter output registers 316a and b which are clocked by the same 40 MHz clocks as input registers 312a and b so that the outputs from registers 316a and b appear one clock period later than the inputs were clocked into input registers 312a and b.

The clock signals for operation of all circuitry within the digital processing circuitry are produced within clock generator circuit 228. A 40 MHz square wave signal is generated by an oscillator which comprises a delay line 356 and inverting amplifier 357. The square wave is buffered and amplified again by inverter and amplifiers 358 and 359 for use by other portions of the circuitry. Ten MHz square wave clock signals $\phi_1$–$\phi_4$ are produced by flip-flops 360, 362a and b, and inverters 363a–d. Flip-flop 360 is toggled by the 40 MHz signal producing 20 MHz square wave signals 180° out of phase with each other on its outputs Q and $\overline{Q}$. Each of these 20 MHz square waves in turn causes flip-flops 362a and b to toggle at a 10 MHz rate, the result being four outputs from the Q and $\overline{Q}$ outputs of flip-flops 362a and b which, starting from $\phi_1$, are shifted 90° with respect to one another in the sequence of $\phi_1$ to $\phi_4$.

From registers 316a and b the radar return signal samples are clocked into input holding registers 320a–d in data storage section 318. The four 4-bit registers 320a–d are clocked respectively with the $\phi_1$, $\phi_3$, $\phi_2$ and $\phi_4$ clock signals loading a two-bit sample from each of registers 316a and b for each clock period into register 320a–d. A total of eight successive two-bit samples are held in registers 320a–d prior to being loaded into shift registers 322a–d.

The digital samples are next loaded from registers 320a–d into shift registers 322a–d. The rate at which the samples are loaded into shift registers 322a–d is dependent upon the range set by range switch 232 as controlled by the shift register clocking rate through read control 361, read/write control 370, and shift register clock generator 398. For ranges between 3 and 32 miles inclusive, the rate at which the samples are loaded or written into shift registers 322a–d is varied with the range setting while on the three lower ranges of 0.25–1.5 miles the rate is fixed. The writing rates are tabulated below in Table 1.

TABLE 1

| Range | Writing Rate | Reading Time |
|---|---|---|
| 0.25 mi. | 10 MHz | 205 μs |
| 0.50 | 10 | |
| 1.50 | 10 | 205 |
| 3 | 5 | 205 |
| 6 | 2.5 | 205 |
| 12 | 1.25 | 205 |
| 24 | 0.625 | 205 |
| 32 | 0.3125 | 205 |

Shift registers 322a–d are each preferably quadruple 256-bit MOS shift registers with two-phase clocking, the clock pulses being 180° apart for proper operation thereof. It is also quite possible to use TTL type shift registers or a random access memory with an addressing counter as these devices will perform the same functions.

After the digital representations have been written into shift registers 322a–d, they are read out via output holding registers 324a–d. The read-out rate and hence the read-out time are constant for the upper six ranges and variable for the lower two ranges. The read-out times are also tabulated in Table 1. Clock signals for the read-out period are produced by read/write control 370, read control 361, and shift register clock generator 398. Output holding registers 324a–d are clocked by a clock signal generated from the clock signal that operates the corresponding shift registers 322a–d. The clock signal to shift register 324b is 180° out of phase with the clock signal to register 324a and the clock signal to register 324d being 180° out of phase with the clock signal to register 324c.

While digital samples which were stored in shift registers 322a–d are being read out through output holding registers 324a–d, it is necessary to merge the sixteen output lines conveying eight samples from output holding registers 324a–d into a single pair of conductors with a single data stream output conveying the two-bit samples in proper sequence. This function is performed by multiplexing circuit 326 containing three separate multiplexers 328a, 328b, and 330. Multiplexers 328a and b select among the four pairs of outputs from output holding registers 324a–d respectively. Control lines 325a and b for multiplexers 328a and b is the same signal that is used to clock registers 324a and c delayed and buffered by two inversions. When line 325a is in the 0 state, the four lines from register 324a are coupled to the four output lines 329a–d of multiplexer 328a as when line 325b is in the 0 state, the output lines from register 324c are coupled to output lines 329e–h from multiplexer 328b. When lines 325a and b are in the 1 state, the output lines from registers 324b and d respectively are coupled to output lines 329a–d for multiplexer 328a and 329e–h for multiplexer 328b. There will be presented to multiplexer 330 at any one time four pairs of lines which are to be placed in sequence, those pairs being 329a and b, 329c and d, 329e and f, and 329g and h. Multiplexer 330 under control of lines 331a and b sequentially selects which of these pairs of lines are to be coupled to output lines 341a and b. When lines 331a and b are both in the 0 state, lines 329a and b are coupled to lines 341a and b; when line 331a is in the 0 state and line 331b is in the 1 state, lines 329c and d will be coupled to lines 341a and b; when line 331a is in the 1 state and line 331b is in the 0 state, lines 329e and f will be coupled to lines 341a and b; and, when lines 331a and b are both in the 1 state, lines 329g and h will be coupled to lines 341a and b. The final result is that lines 341a and b convey an output data stream of digital samples or representations of the input radar return signals with a total period different for each of the radar return signals than they were originally read into the shift registers in real time.

The output digital samples on lines 341a and b are next converted to an analog waveform representation of the input signal. For at least some ranges is a duplicate of the original received analog waveform except that it has been expanded in time so that the display of the signal can be accomplished at a slower rate and accordingly that the screen may be brightened and the deflection amplifiers for the cathode-ray tube need respond only at the slower rate. The signals on lines 341a and b are coupled to decoder 342, the output of which is coupled to the three variable resistors 344a, b, and c.

When both of lines 341a and b are in the 0 state, none of the output lines from decoder 342 are activated and hence no current flows through any of variable resistors 344a, b and c. When line 341a is in the 0 state and line 341b is in the 1 state, the upper output line from decoder 342 is activated and current flows through variable resistor 344a, the magnitude of the current varying with the position of the wiper arm of variable resistor 344a. Further, when line 341a is in the 0 state and line 341b is in the 1 state, only the center line of decoder 342 is activated and current flows only through variable resistor 344b. Finally, when both lines 341a and b are in the 1 state, only the lower output line from decoder 342 is activated and current flows through variable resistor 344c. The current flows from these resistors to the input of video amplifier 350, a high input impedance operational amplifier. Feedback around video amplifier 350 is provided by feedback variable resistor 346, the adjustment of which determines the net gain of the amplifier circuit. The output of video amplifier 350 is coupled to cathode 352 of cathode-ray tube 246. The brightness of cathode-ray tube 246 is of course dependent upon the output voltage and current levels from video amplifier 350.

Range switch 232 is divided into two sections 365a and b with the moveable center contacts of the two sections ganged together. There are eight positions in each of the sections, one for each range between ¼ mile (i.e., nautical mile) and 32 miles. Upper section 365a of range switch 365 controls the writing or reading in of the digital radar return signals into shift registers 322a–d of FIG. 3A. The center contact of section 365a as well as of 365b is grounded. The fixed contacts for the ¼, ½ and 1.5 mile ranges are interconnected since the frequency of the clock used for writing for these three ranges is constant. These three contacts and each of the other contacts are connected to inverters and buffers 366a–f. As ground represents the logical 0 state, the inverter whose input is grounded through the center contact will have a logical 1 on its output while all the other inverters 366a–f have a logical 0 on their outputs. For example, with the center contact in the 1.5 mile position, as shown in FIG. 3B, the output of inverter 366a will be a 1 while the outputs from inverters 366b–f are all in the 0 state. Counters 369a and b provide five outputs labeled $2^0$ through $2^4$, each of which is logically NANDed in sequence with the outputs of inverters 366b–f while the 10 MHz clock signal is NANDed with the output of inverter 366a. The $2^0$ output of counter 369a toggles at one-half the input clock rate of 10 MHz from the $\phi_1$ clock signal while each of the other outputs toggles at one-half the rate of its preceding output. The output of inverter 366a–f which is in the logical 1 state enables the selected one of the counter outputs to be gated through the corresponding NAND gate while all others are disabled and blocked. For the example given, the $2^0$ output of counter 369a is NANDed with the output of inverter 366a then in the 1 state, thus inverting the counter output and coupling it to clock line 364. All of NAND gates 367a–f are of the open collector type wherein output load resistor 368 interconnects all NAND gate outputs and provides a load to the +V power supply connection providing what is commonly termed a wire "OR" connection. The frequency of the clock signal on line 364 is thus dependent upon the range setting chosen and, in fact, is proportional to the range for the upper five ranges.

Lower section 365b of range switch 232 controls the clock signals for reading data out of the data storage section 318. Since the data for the ¼, ½ and 1.5 mile ranges is read into shift registers 322a–d at the same 10 MHz rate while each of the other ranges has a different clock rate, it is necessary to read the data out of the shift registers 322a–d at a different clock rate for the lower ranges in order to preserve the same read out time for all ranges. A wire OR connection is performed upon line 386 by NAND gates 384 and 385 with load resistor 388 much in the same manner as in the write control circuit to provide the proper reading clocking. When range switch 232 is in one of the ranges 1.5–32 miles, the input to inverter 382 is in the 0 state and while its output is in the 1 state thereby enabling the other input to NAND gate 385, which is the $2^2$ output from counter 381 passed through inverter 387 for proper phasing. When range switch 232 is in either the ¼ or ½ nautical mile position, one of the two inputs to NAND gate 383 is in the logical 0 state and its output is in the logical 1 state thereby enabling the other input to NAND gate 384 which is the $2^1$ output from counter 381.

The input clock for counter 381 is generated by flip-flops 375 and 376 and is coupled to the clock input through gates 377 and 380 or through gates 378 and 380. Gate 377 is activated when range switch 232 is in the ¼ range while gate 378 is activated through inverter 379 when the range switch is in the ½ mile range. Flip-flops 375 and 376 are in turn controlled by read/write flip-flop 372 and control flip-flop 373. A logical 1 on the $\overline{Q}$ output of read/write flip-flop 372 indicates that the reading operation is to be performed. While this line is in the 0 state, flip-flops 373, 375, and 376 are each held with logical 0's on their Q outputs and logical 1's on their $\overline{Q}$ outputs and do not change states with the clock signal. When the $\overline{Q}$ output of read/write flip-flop 372 changes from 0 to 1, all three of flip-flops 373, 375 and 376 are enabled. Since the $\overline{Q}$ output of flip-flop 375 is coupled to the J input of flip-flop 373, control flip-flop 373 will change states at the next phase 2 clock signal edge after being enabled. Thus, when the range switch 232 is in either the ¼ or ½ mile position, the lower line to NAND gate 374 will be in the logical 1 state and the $\overline{Q}$ output of flip-flop 373 will be in the logical 1 state before the first $\phi_2$ clock signal transition after the $\overline{Q}$ output of flip-flop 372 changes from the 0 to 1 state. Consequently, with a logical 1 on both inputs of NAND gate 374 for one clock period, the J input of flip-flop 375 will be in the 0 state for the first clock period after the $\overline{Q}$ output of flip-flop 372 changes from 0 to 1. After that, the J input of flip-flop 372 remains in the 1 state and flip-flop 375 will toggle at one-half the rate of its 10 MHz $\phi_2$ clock input. On the other hand, when range switch 232 is in a range from 1.5 to 32 miles, the lower input of NAND gate 374 is in the logical 0 state and its output will be fixed in the logical 1 state and hence flip-flop 375 begins toggling at half the rate of the $\phi_2$ clock as soon as the $\overline{Q}$ output from read/write flip-flop 372 changes from the 0 to 1 state. Flip-flop 376 with both J and K inputs permanently in the logical 1 state and with its clock input coupled to the Q output of flip-flop 375 toggles at one-half the rate of flip-flop 375 or one-fourth the rate of the 10 MHz $\phi_2$ clock signal. When range switch 232 is in the ¼ mile position, the output of inverter 379 will be in the logical 1 state and the Q output of flip-flop 376 becomes the clock signal for counter 381. In all other ranges, the Q output from flip-flop 375 becomes the clock input to counter 381.

Shift register clock pulse generator 398 supplies the clock signals to shift registers 322a–d for both reading and writing operations. At the beginning of a radar transmission, read/write flip-flop 372 is preset with a logical 1 on the Q output and a logical 0 on the $\overline{Q}$ output by a trigger pulse on line 261 applied from the pulse driver circuit illustrated in FIG. 2 above. This same pulse also clears counter 371 and flip-flops 392a–d. The logical 1 state on the Q output of read/write flip-flop 372 enables the other inputs to NAND gates 390a and 391a, the other inputs being the write clocking signal on line 364. This signal is then coupled through NAND gates 390c and 391c to toggle flip-flops 392a and c and through inverters 390d and 391d to toggle flip-flops 392b and d. Toggle flip-flops 392a–d generate the two-phase clock necessary to operate shift registers 322a–d which, in the preferred embodiment, are MOS type shift registers which require two-phase clock operation. The clock signals to flip-flops 392a–d are NANDed with both the Q and $\overline{Q}$ outputs of these flip-flops by NAND gates 394a–h. The outputs of each of these NAND gates are inverted by inverters 395a–h and are buffered through buffer amplifiers 396a–h. They then are coupled through resistors 397a–h to the clock inputs of shift registers 322a–d as indicated by reference letters A–D. Shift registers 322a–d are thereby clocked in sequence by the signals generated from toggle flip-flops 392a–d. First shift register 322a is clocked, then 322b, then 322c and finally 322d before shift register 322a is clocked again. AND gates 393a and b AND together the clock signals from the outputs of gates 394a and b and 394e and f respectively to produce the clock signals for output holding registers 324a and d as well as the control signals for multiplexers 328a and b on the lines referenced E and F.

Additionally, the output of NAND gate 393a is used as the clock signal for counter 371. Counter 371, a 256-bit binary counter, begins its count with the loading of the first digital sample into shift registers 322a–d and produces a logical 1 output on the $2^8$ output line when the 256th sample has been loaded. This logical 1 is inverted to a logical 0 which then resets flip-flop 372 to logical 0 on the Q output and logical 1 on the $\overline{Q}$ output, remaining in those states until reset by the pulse on line 261. As described previously, the changing of states of flip-flop 372 initiates the reading operation.

In FIGS. 4A–E are shown a series of waveforms illustrating the write and read video timing for the ranges of 6 and 12 miles. In FIG. 4A is shown the pulse initiating the beginning of the radar transmission period as it would appear on line 261. This pulse repeats at a rate of approximately 1500 Hz, the radar transmission repetition rate for the preferred embodiment. In FIG. 4B is shown the input video signal as it would appear on line 233. Peaks 410–418 represent return echoes from various targets within the area scanned by the radar antenna. For the 6 mile range, 256 digitized samples of the radar return signal are written into data storage unit 318 in a period of 39.6 μsec. After this time, the samples are read back out of data storage unit 318 in a fixed time period of 205 μsec, as shown in FIG. 4C. The waveform in FIG. 4C would appear on the output of video amplifier 352 on line 351. The waveform of FIG. 4C appears as the first 39.6 μsec of the waveform of FIG. 4B only expanded in time. Only peaks 410 and 412 of FIG. 4B appear in FIG. 4C since they are within 6 miles in distance. In FIG. 4D, when the range switch is set for a range of 12 miles, the same signal is seen on line 223 but the digitized samples of the signal are written into data storage unit 318 for 73.8 μsec or twice the time period for the 6 mile range. When the samples are read out from data storage unit 318 as shown in FIG. 4E, in the same 205 μsec time period as in FIG. 4C, the video signal appears at half the expansion scale of FIG. 4C but peaks representing targets within 12 miles appear within the signal.

In FIGS. 4F and G are shown the voltage waveform at deflection coils 248 for the 6 and 12 mile ranges respectively.

Although specific embodiments of the invention have been described, numerous modifications and alterations thereto would be apparent to one skilled in the art without departing from the spirit and scope of the present invention.

What is claimed is:

1. In combination:
means for storing digital representations corresponding to a plurality of ranges of a radar return signal;
means for writing said representations into said storing means in a first time period;
means for reading out said representations in a second time period, said second time period being greater than said first time period for the shorter ranges of a radar range setting and said second time period being constant for at least some ranges of said radar range setting; and
means for displaying said signal, said displaying means being coupled to said reading out means.

2. The combination in accordance with claim 1 wherein said storing means comprises one or more shift registers for storing said digital representations.

3. The combination in accordance with claim 1 wherein said storing means comprises:
a random access memory; and
means for addressing said memory, said addressing means being coupled to address inputs of said memory.

4. The combination in accordance with claim 1 wherein said first time period is proportional to said radar range setting.

5. The combination in accordance with claim 4 wherein the brightness of said displaying means is constant among a plurality of predetermined range settings at the shorter ranges.

6. A radar bright display system for displaying radar data on short radar ranges at substantially the same brightness as displayed on longer ranges comprising in combination:
means for storing digital representations corresponding to a plurality of ranges of a radar return signal;
means for writing said representations into said storing means in a first time period, said first time period being proportional to a radar range setting;
means for reading out said representations in a second time period, said second time period being greater than said first time period for at least some shorter ranges of said radar range setting and said second time period being constant among at least some of said shorter ranges of said radar range setting;
means for displaying said signal in response to outputs of said storing means, the writing rate upon said displaying means being constant for a plurality of said range settings of both longer and shorter ranges; and
means for transmitting a radar pulse.

7. The combination in accordance with claim 6 further comprising means for receiving radar signals.

8. The combination in accordance with claim 7 further comprising means for digitizing said radar signals, digitizing means having an input coupled to said receiving means and an output coupled to said storing means.

9. The combination in accordance with claim 8 further comprising means for converting said stored signals to an analog signal, said converting means being coupled to said displaying means.

10. The combination in accordance with claim 9 wherein said writing means comprises means for clocking said representations into said storing means.

11. A radar system comprising in combination:
means for transmitting a radar pulse;
means for receiving radar signals;
means for converting received radar signals corresponding to a plurality of radar ranges to digital representations thereof;
said converting means being coupled to said receiving means;
means for storing digitized radar signals;
means for clocking said digitized signals into said storing means in a first time period, said first time period being proportional to a radar range setting;
means for clocking said representations out of said storing means in a second time period, said second time period being greater than said first time period for at least some shorter ranges of said radar range setting, and said second time period being constant among at least some of said shorter ranges of said radar range setting; and
means for displaying said signals in response to outputs of said storing means, the writing rate upon said displaying means and the brightness of said display being determined by said clocking out rate and constant for a plurality of said predetermined ranges.

12. The combination in accordance with claim 11 wherein said writing means comprises:
a radar range switch for selecting among a plurality of ranges;
first means for producing digital timing clock pulses;
means for producing a continuously cycling binary count, said count producing means operating in response to said source of digital timing clock pulses and said count producing means having a plurality of outputs; and
means for selecting one of said outputs of said count producing means or said source of digital timing clock pulses, said selecting means being coupled to said radar range switch and operating in response to the range setting of said radar range switch.

13. The combination in accordance with claim 12 wherein said reading means comprises second means for producing digital timing clock pulses, the frequency of said digital timing clock pulse producing means being constant among at least some of said ranges.

14. The combination in accordance with claim 13 wherein said storing means comprises:
a plurality of input storage registers, each of said registers storing one digital sample of said radar return signal and each of said registers having a plurality of bit positions; and
a plurality of banks of shift registers, one of said banks being coupled to each one of said input storage registers and one shift register within each of said banks of shift registers.

15. The combination in accordance with claim 12 further comprising means for producing digital representations of a radar return signal.

16. The combination in accordance with claim 15 wherein said digital representation producing means comprises:
   means for sampling said radar return signal at a predetermined rate; and
   means for converting said samples to digital representations.

17. The combination in accordance with claim 16 wherein said displaying means comprises a cathode-ray tube display, said cathode-ray tube display producing visual indications in response to said digital representations.

18. The combination in accordance with claim 16 further comprising a plurality of means for varying the brightness of said visual indications.

19. The combination in accordance with claim 17 wherein one of said brightness varying means is provided for each digital level.

20. The combination in accordance with claim 11 further comprising means for continuously varying said radar range setting.

21. The method of radar processing multiple range digital signals for display comprising the steps of:
   transmitting radar signals;
   receiving radar return signals;
   converting received radar return signals to digital representations thereof;
   storing at least a portion of said digital representations of radar signals at a first rate having a first time period corresponding to preselected ranges;
   reading out said stored digital representations of radar return signals at a second rate having a second time period greater than said first time period for at least some shorter ranges of said preselected ranges, and providing said second time period is constant among at least some of the shorter ranges of said preselected ranges; and
   producing a visual display in response to read-out digital representations of said radar return signals, the display time for some of said read-out signals at shorter ranges being longer than the time period during which said signals were stored to provide a substantially constant brightness of display for said ranges.

22. The method in accordance with claim 21 further comprising the step of converting said read-out radar return signals to an analog representation thereof.

23. The method in accordance with claim 22 wherein said digital representations of radar return signals are stored in one or more shift registers.

24. The method in accordance with claim 22 wherein said digital representations of radar return signals are stored in a random access memory.

25. A multiple range radar digital cathode-ray display having means for storing digital representations corresponding to a plurality of ranges of a radar return signal; means for writing digital representations into a storing means in a first time period;
   means for reading stored digital representations in a second time period, said second time period being greater than said first time period for the shorter ranges of a radar range setting, said second time period being constant for at least some of said ranges of said radar range setting to provide increased display time periods on short ranges having substantially constant brightness over the multiple ranges.

* * * * *